(12) United States Patent
Yoon (10) Patent No.: US 12,476,828 B2
(45) Date of Patent: Nov. 18, 2025

(54) TLS-BASED AUTHENTICATION METHOD WITHOUT INTERVENTION OF CERTIFICATE AUTHORITY

(71) Applicant: ELECTRONICS AND TELECOMMUNICATIONS RESEARCH INSTITUTE, Daejeon (KR)

(72) Inventor: Daegeun Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 89 days.

(21) Appl. No.: 18/393,479

(22) Filed: Dec. 21, 2023

(65) Prior Publication Data

US 2024/0214222 A1 Jun. 27, 2024

(30) Foreign Application Priority Data

Dec. 21, 2022 (KR) .................. 10-2022-0180265
Nov. 20, 2023 (KR) .................. 10-2023-0161066

(51) Int. Cl.
*H04L 9/32* (2006.01)
*H04L 9/08* (2006.01)
*H04L 9/30* (2006.01)
*H04L 9/40* (2022.01)

(52) U.S. Cl.
CPC .......... *H04L 9/3268* (2013.01); *H04L 9/3073* (2013.01); *H04L 9/3218* (2013.01)

(58) Field of Classification Search
CPC ... H04L 9/3268; H04L 9/3073; H04L 9/3218; H04L 9/0844; H04L 63/0823; H04L 63/166; H04L 9/321; H04L 9/3247
See application file for complete search history.

(56) References Cited

U.S. PATENT DOCUMENTS

| 8,504,832 | B2 | 8/2013 | Kim et al. |
| 9,350,556 | B1* | 5/2016 | Taly .................... H04L 63/0823 |
| 10,951,421 | B2* | 3/2021 | Rossi .................. H04L 63/0823 |
| 12,231,584 | B1* | 2/2025 | Stapleton .............. H04L 9/3263 |

(Continued)

FOREIGN PATENT DOCUMENTS

KR 101466900 B1 12/2014

OTHER PUBLICATIONS

Laurent Chuat et al., "SoK: Delegation and Revocation the Missing Links in the Web's Chain of Trust", 2020 IEEE European Symposium on Security and Privacy (EuroS&P), 2020, pp. 624-638.

*Primary Examiner* — Darren B Schwartz
(74) *Attorney, Agent, or Firm* — Rabin & Berdo, P.C.

(57) ABSTRACT

A transport layer security (TLS)-based authentication method according to the present invention includes: receiving, in a web server, a certificate for TLS authentication issued from a certificate authority on a web server; transmitting a delegated request from the web server to a delegated entity; receiving, in the web server, a public key among a public key-private key pair generated by the delegated entity in response to the delegated request; generating, in the web server, delegated data based on the public key; generating, in the web server, delegated proof data of the same version as the delegated data; storing, in the web server, the delegated proof data in a delegated proof data storage; and transmitting the certificate and delegated data from the web server to the delegated entity.

16 Claims, 8 Drawing Sheets

(56) References Cited

U.S. PATENT DOCUMENTS

| | | | |
|---|---|---|---|
| 2005/0021969 A1* | 1/2005 | Williams | H04L 9/3268 713/176 |
| 2006/0004662 A1* | 1/2006 | Nadalin | H04L 63/0823 705/50 |
| 2007/0192836 A1* | 8/2007 | Shiran | H04L 9/321 713/168 |
| 2008/0126794 A1* | 5/2008 | Wang | H04L 9/3263 713/153 |
| 2009/0083538 A1* | 3/2009 | Merugu | H04L 63/0281 713/153 |
| 2011/0231651 A1* | 9/2011 | Bollay | G06F 21/606 713/153 |
| 2013/0156189 A1 | 6/2013 | Gero et al. | |
| 2013/0159179 A1 | 6/2013 | Choi et al. | |
| 2017/0111323 A1* | 4/2017 | Borkar | H04L 9/321 |
| 2018/0091314 A1* | 3/2018 | Li | G06F 21/57 |
| 2020/0314189 A1* | 10/2020 | Pillers | G06Q 30/0201 |

* cited by examiner

TLS-BASED AUTHENTICATION METHOD WITHOUT INTERVENTION OF CERTIFICATE AUTHORITY

CROSS-REFERENCE TO RELATED APPLICATION

This application claims priority to and the benefit of Korean Patent Application No. 10-2022-0180265, filed on Dec. 21, 2022, and the benefit of Korean Patent Application No. 10-2023-0161066, filed on Nov. 20, 2023, the disclosure of which is incorporated herein by reference in its entirety.

BACKGROUND

1. Field

The present invention relates to a transport layer security (TLS)-based authentication method without intervention of a certificate authority.

2. Description of Related Art

Figure 1:
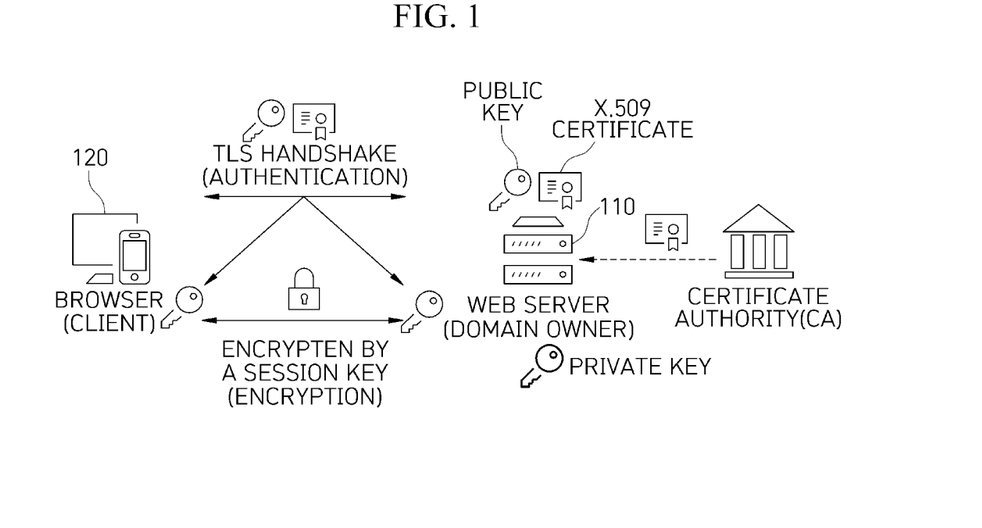
FIG. 1 is a diagram for describing a transport layer security (TLS) protocol in the related art.

FIG. 1 is a diagram for describing a transport layer security (TLS) protocol in the related art.

A transport layer security (TLS) protocol on a web is end-to-end that an protocol provides encrypted communication between both a browser 120 and a web server 110 (client and server). This means that the communication between the browser 120 and the web server 110 takes place directly without any intervention halfway, and communication contents are protected from being viewed from the outside.

However, in today's web, an intermediate entity (or delegated entity) such as a content delivery network (CDN) exists between the browser 120 and the web server 110, and it is rare to simply perform TLS communication between the browser 120 and the web server 110.

In this case, there are concerns about data security and compliance due to the intervention of the intermediate entity such as CDN, and in the case of sensitive data, these issues need to be additionally considered.

SUMMARY

The present invention provides a transport layer security (TLS)-based authentication method without intervention of a certificate authority that can allow an authentication subject to manage (add, delegate, and revoke) TLS authentication keys without intervention of a certificate authority.

However, the problems to be solved by the present invention are not limited to the problems described above, and other problems may be present.

According to a first aspect of the present invention, a transport layer security (TLS)-based authentication method includes: receiving, in a web server, a certificate for TLS authentication issued from a certificate authority; transmitting a delegated request from the web server to a delegated entity; receiving, in the web server, a public key among a public key-private key pair generated by the delegated entity in response to the delegated request; generating, in the web server, delegated data based on the public key; generating, in the web server, delegated proof data of the same version as the delegated data; storing, in the web server, the delegated proof data in a delegated proof data storage; and transmitting the certificate and delegated data from the web server to the delegated entity.

According to a second aspect of the present invention, a TLS-based authentication method includes: requesting delegated proof data from a browser to a web server; receiving, in the browser, the requested delegated proof data from a delegated proof data storage of the web server; transmitting a client hello message from the browser to a delegated entity; receiving, in the browser, a server hello message from the delegated entity in response to the client hello message; verifying, in the browser, whether the delegated entity has received an authentication authority based on the server hello message; and exchanging a symmetric key for encryption with the delegated entity as the verification is completed in the browser.

A computer program according to another aspect of the present invention for solving the above-described problems is combined with a computer that is hardware to execute the TLS-based authentication method without intervention of a certificate authority, and is stored in a computer-readable recording medium.

Other specific details of the invention are included in the detailed description and drawings.

DETAILED DESCRIPTION

Various advantages and features of the present invention and methods accomplishing them will become apparent from the following description of embodiments with reference to the accompanying drawings. However, the present invention is not limited to embodiments to be described below, but may be implemented in various different forms, these embodiments will be provided only in order to make the present invention complete and allow those skilled in the art to completely recognize the scope of the present invention, and the present invention will be defined by the scope of the claims.

Terms used in the present specification are for explaining embodiments rather than limiting the present invention. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components mentioned and includes all combinations thereof. Although "first," "second," and the like are used to describe various components, it goes without saying that these components are not limited by these terms. These terms are used only to distinguish one component from other components. Therefore, it goes without saying that the first component mentioned below may be the second component within the technical scope of the present invention.

Unless defined all otherwise, terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

Hereinafter, the background to which the present invention was conceived will be described to help those skilled in the art understand, and then the present invention will be described in detail.

First, contents related to an X. 509 certificate will be described.

Currently, authentication on a web is performed through the X.509 certificate issued by a certificate authority (CA) after the CA authenticates an identity of an authentication subject. The process of issuing, by the certificate authority, the X. 509 certificate to the authentication subject is as follows.

① First, the authentication subject, such as a website, individual, or company, submits its identity information and a public key to be used in a later authentication process to the certificate authority.

② Next, the certificate authority confirms the submitted information through an identity verification process. This process may be performed in various methods. The verification is possible by various methods such as written confirmation of submission and confirmation of documents and documentation, email verification where a confirmation link is sent to a specific email address and an authentication subject confirms by clicking a link, phone confirmation, web process confirmation that confirms information of an authentication subject through a web-based form.

③ Next, when the verification is completed, the certificate authority signs the X.509 certificate including the identity information of the authentication subject and public key with a private key of the certificate authority and then issues the signed X.509 certificate to the authentication subject.

In this case, only the authentication subject has the private key paired with the public key included in the X. 509 certificate. Later, the authentication subject may prove that the identity specified in the X.509 certificate represents itself by proving ownership of the corresponding private key.

Next, contents related to a TLS protocol will be described.

Currently, the TLS protocol is widely used as a method for exchanging encrypted packets on a network. In particular, the TLS protocol is widely used to protect passwords, financial information, etc., from external attacks when communicating between a browser and a web server. The TLS protocol largely performs two processes: 'authentication' and 'encryption'. The communication process through the TLS may be summarized as follows.

① First, when a user enters, to a browser, a website address he or she wants to access, the browser starts communicating with a web server hosting the corresponding website.

② Next, the web server generates the X. 509 certificate previously issued from the certificate authority and private key ownership proof data corresponding to the public key of the X.509 certificate and transmits the X. 509 certificate and the private key ownership proof data to the browser. In this case, the X.509 certificate includes a website address and the public key of the web server.

③ Next, the browser receives a response from the web server and then authenticates the web server through the following process.

③-1) The browser confirms whether the website address specified in the X.509 certificate provided by the web server matches the address that it accesses.

③-2) It is confirmed whether the private key ownership proof data provided by the web server is verified with the public key of the web server included in the X. 509 certificate.

③-3) It is confirmed whether the signature of the X. 509 certificate is verified with the public key of the certificate authority that the browser can trust. In this case, the public key of the certificate authority trusted by the browser is owned in advance.

④ Next, when the authentication is completed normally, the private key for encryption is exchanged between the browser and the web server.

Thereafter, the encrypted communication starts and data is encrypted and transmitted. Meanwhile, since the encryption process is not a technical feature targeted by the present invention, detailed description will be omitted below.

Next, the problems with the conventional TLS protocol will be described.

The TLS protocol on the web corresponds to an end-to-end protocol that provides the encrypted communication between both the browser and the web server. However, in today's web, a delegated entity called a content delivery networks (CDN) exists between the browser and the web server, and it is very rare to simply perform the TLS communication between the browser and the web server.

Figure 2:
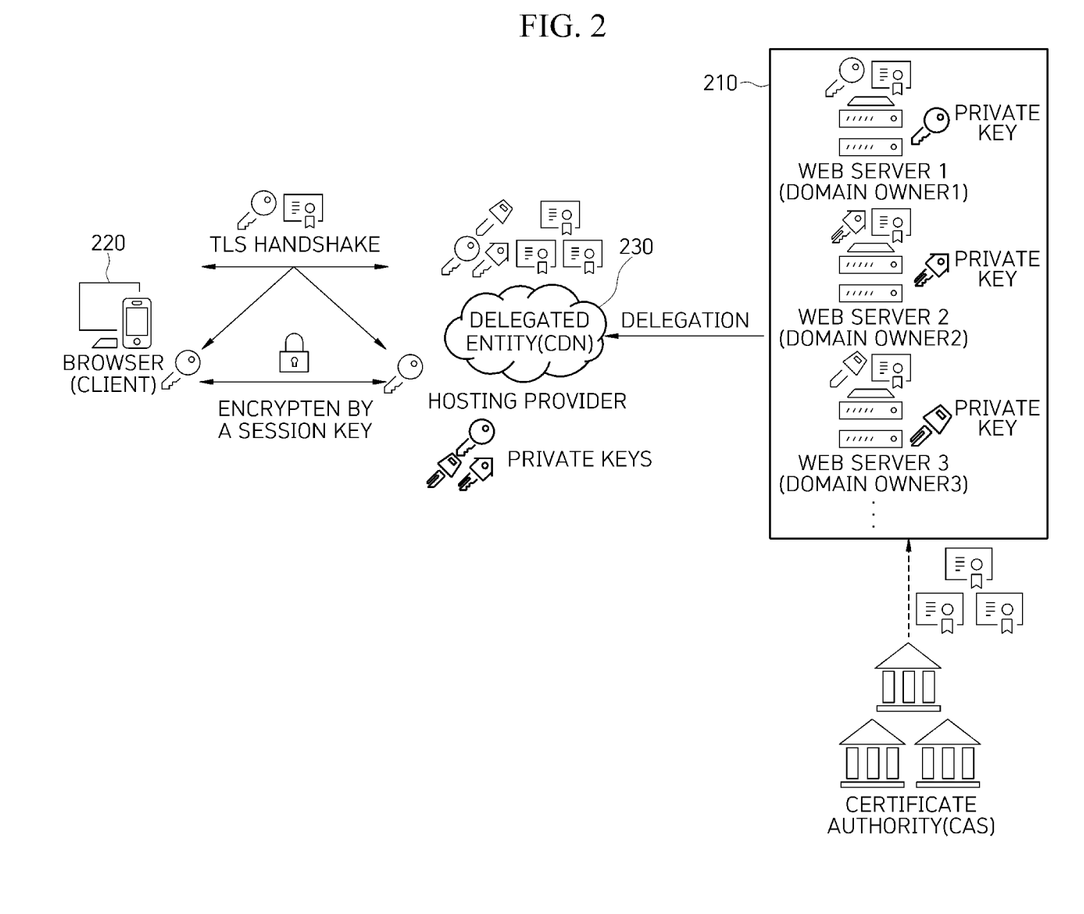
FIG. 2 is a diagram for description of TLS communication in which a delegated entity exists in the related art.

FIG. 2 is a diagram for description of the TLS communication in which the delegated entity exists in the related art.

Today, most web service companies provide web services using servers of CDN companies 230 installed around the world instead of using servers 210 of the web service companies in order to provide smooth services all over the world. In this way, in order for the web service companies 210 to provide services through the CDN 230, the web service companies 210 should delegate an authentication authority that may provide services to the CDN 230 on their behalf.

However, since the TLS protocol is an end-to-end protocol that does not consider an intermediate entity such as the CDN (230) between the browser 220 and the web server 210, the TLS protocol standard does not specify a method of delegating an authentication authority to a CDN 230. Therefore, today, on the web, the authentication authority is delegated in an unusual way, and the most representative method is a method of sharing a private key of an X.509 certificate on a web server 210. This method is a method of violating the most basic rule of cryptography: "Only the owner of the private key should know the private key." Delegating the private key with all the authentication authorities of the web service to a third party, the CDN 230, may cause great risk.

In addition, today, a small number of CDN companies manage private keys of certificates of numerous web service companies, which may be a single point of failure (SPOF) that may cause enormous damage if malicious attackers attack a single system.

In a situation where the private key of the certificate is shared with the shared CDN, it is essential to revoke the trustworthy certificate in order to no longer use the CDN or to revoke the delegated authority due to the problem with the CDN. When the certificate is not revoked properly, the CDN or attacker with the revoked certificate and private key will still be able to perform authentication by impersonating a website. However, due to the centralized X.509 certificate management structure, it is very difficult to revoke the trustworthy X.509 certificate.

The revocation of the X.509 certificate including the authentication key of the authentication subject is possible only through the certificate authority. Currently, only dozens of trustworthy certificate authorities on the web are managing billions of X.509 certificates. A certificate revocation list (CRL) for billions of X.509 certificates should be managed separately by dozens of certificate authorities. In this structure, the size of the CRL may be up to 100 MB. This size is unrealistic to periodically distribute the CRL to all browsers around the world.

Therefore, each browser summarizes and uses the CRL in its own way. For example, in the case of Google's Chrome, only about 1% or less of major certificates are included in the CRL (CRLSet) for verification. In other words, for the certificates that are not included in the 1%, the authentication process is performed without verifying whether the certificates have been revoked. Not only Chrome, but also Mozilla's Firefox browser and Apple's Safari browser use this method to verify whether or not the certificates are revoked.

The categories of methods for solving this X.509 authentication delegation problem largely include secure socket layer (SSL) splitting and keyless SSL methods.

Figure 3:
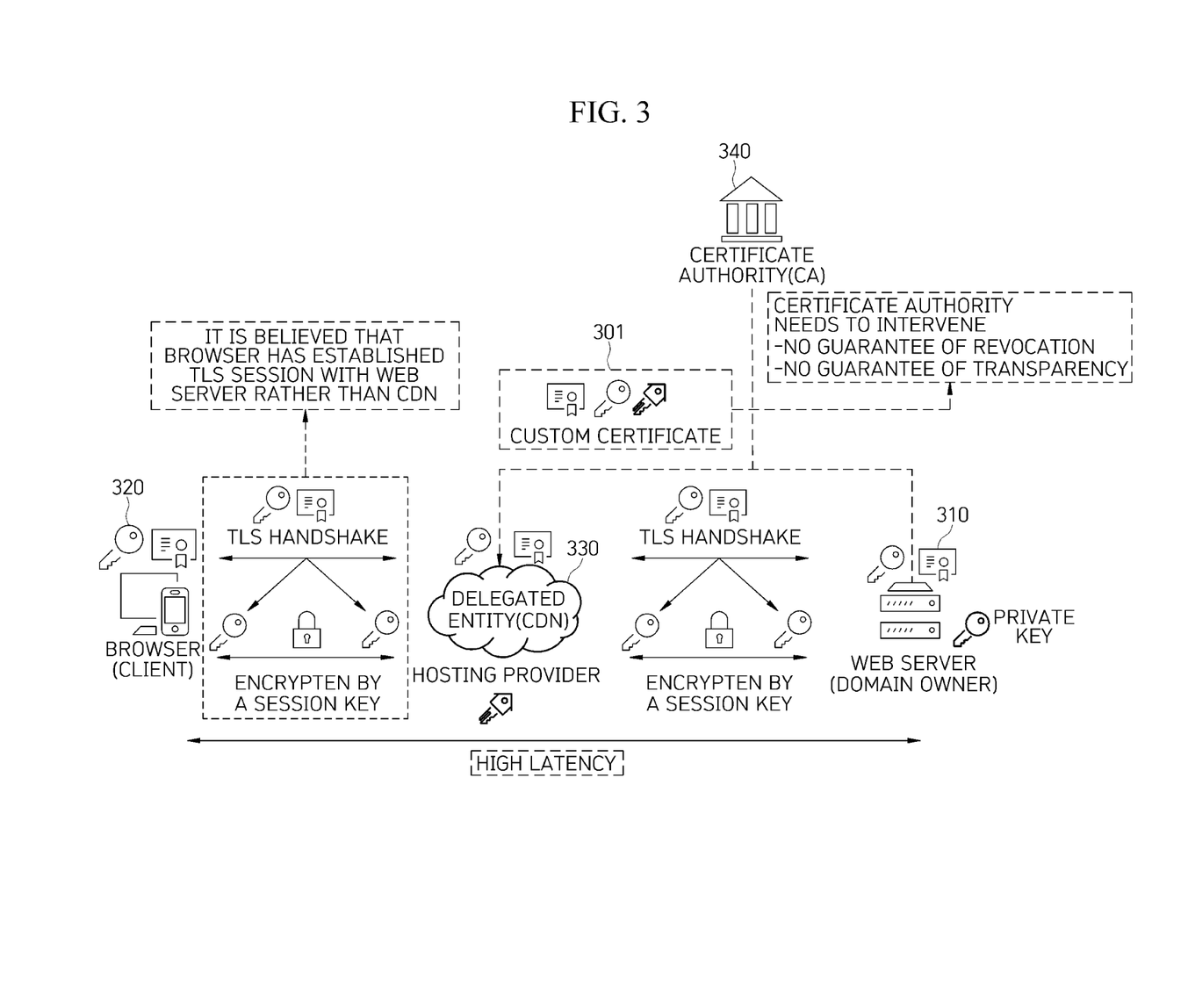
FIG. 3 is a diagram illustrating an example of an operation process of the conventional secure socket layer (SSL) splitting method.

FIG. 3 is a diagram illustrating an example of an operation process of the conventional SSL splitting method.

As illustrated in FIG. 3, the SSL splitting method is a protocol that allows a web service provider 310 to issue a custom certificate 301 to an agent 330 such as the CDN through linkage with the certificate authority, and relays traffic after an agent concludes a separate TLS handshake between a service user and provider.

However, this SSL splitting method is a structure in which the CDN 330 relays between the service user 320 and the provider 310, and does not fit the purpose of the CDN which is used for performance improvement, security, or the like.

In addition, in the process of issuing the delegated certificate to the CDN 330, direct intervention by a certificate authority 340 may be required, and transparency regarding whether the user 320 communicates with the CDN 330 or directly with the web service provider 310 is not provided. Although research on improving the SSL splitting has been consistently published in academia, it is understood that the SSL splitting method is not widely used in the current CDN market due to the failure to completely overcome the limitations described above.

Figure 4:
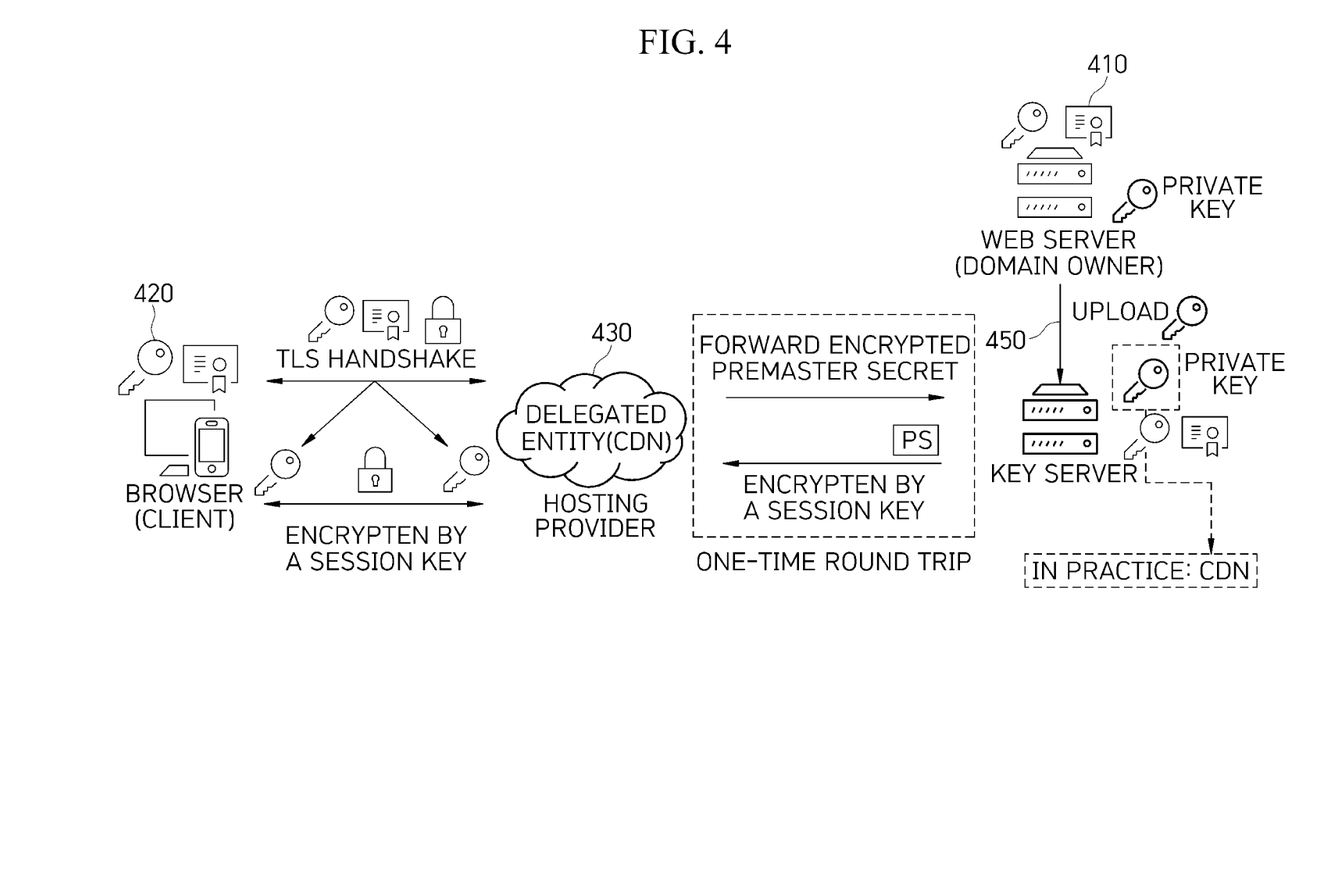
FIG. 4 is a diagram illustrating an example of an operation process of the conventional keyless SSL method.

FIG. 4 is a diagram illustrating an example of an operation process of the conventional keyless SSL method.

As illustrated in FIG. 4, the keyless SSL method is a technology that safely stores private keys in a key server 450 managed by a web service provider 410, and allows the key server 450 to decrypt the data and return the decrypted data to the CDN 430 when the CDN 430 requests the key server 450 to perform a decryption operation only once during the handshake with a user 420. Thereafter, the CDN 430 may safely provide services by exchanging symmetric keys with the user 420 based on the decrypted data.

However, in the case of the keyless SSL, the web service provider 410 has the burden of managing the key server 450, which requires high availability, and for reasons of this system operation structure, in many cases, the key server 450 is not managed by the web service provider, but by the CDN 430. Therefore, the keyless SSL method may be seen as a structure that still violates a fundamental rule of public key infrastructure (PKI): "The private key should be managed by the private key owner."

In order to solve the X.509 delegation problem described so far, the following requirements should be satisfied. In other words, it should be satisfied that the delegation without exposing the private key of the X. 509 certificate, the revocation of the delegated authentication key, the delegation, and the revocation of the authentication key are performed independently without the intervention of the certificate authority.

To solve this problem, the TLS-based authentication method according to the embodiment of the present invention proposes a method that allows the authentication subject to manage (add, delegate, and revoke) the TLS authentication key without the intervention of the certificate authority. To this end, the TLS-based authentication method proposes an improved TLS protocol authentication data model for authentication key management without the intervention of the certificate authority, proposes a data structure that may add, delegate, and revoke the authentication key with the certificate authority of the X.509 certificate without the intervention of the certificate authority, and proposes a TLS authentication procedure using the authentication key managed without the intervention of the certificate authority.

Prior to a detailed description of the present invention, the conventional TLS authentication data model will be briefly described.

Figure 5:
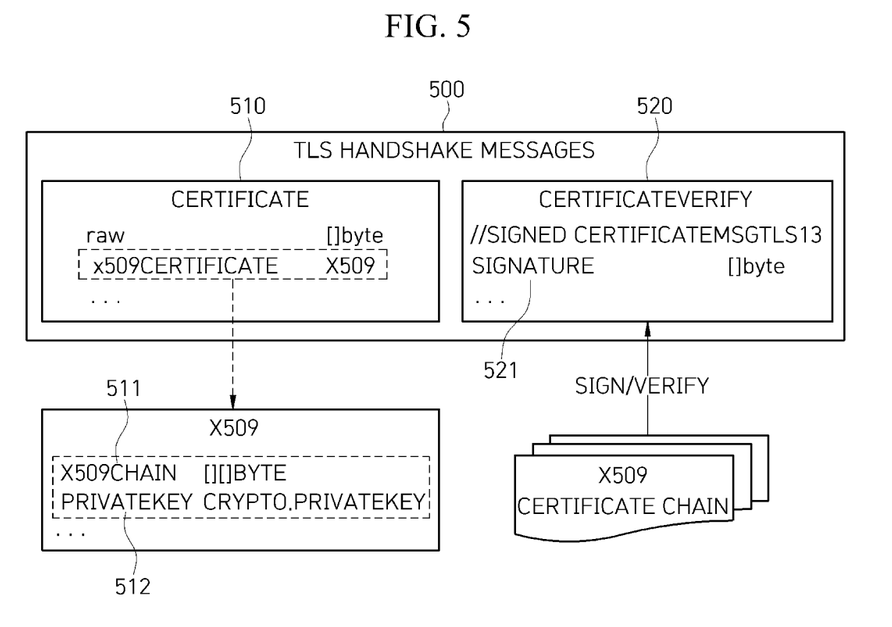
FIG. 5 is a diagram for describing the existing TLS authentication data model.

FIG. 5 is a diagram for describing the existing TLS authentication data model.

FIG. 5 illustrates a data model for generating and verifying a TLS handshake message used in the TLS authentication procedure. An authentication information (certificate, 510) message and an authentication verification information (CertificateVerify 520) message are formed inside a TLS handshake message 500.

First, the components of the certificate message include an X.509 certificate including the URL and public key of the web server, and an X.509 certificate including the identity information of the CA that issued the certificate to the web server (x509Chain, 511). In addition, a private key (private key, 512) paired with the public key of X. 509 certificate of the authentication subject is included.

The CertificateVerify message includes a value 521 of signing the TLS handshake message with the private key.

Referring to FIG. 5, the existing TLS handshake authentication process is summarized as follows.
① First, the browser accesses the web server indicated by the URL and transmits a ClientHello message.
② Next, the web server generates the TLS handshake message and transmits the generated TLS handshake message to the browser.
②-1) In this case, the web server generates data to be included in the x509Certificate message and other TLS handshake messages, as illustrated in FIG. 5.
②-2) The message generated in ②-1) is signed with the private key paired with the public key of X.509 certificate of the web server, and then the CertificateVerify message including the signature is generated.

②-3) The TLS handshake message is generated as the message generated in ②-1) and 2) and transmitted to the browser.

③ Next, the browser verifies the TLS handshake message received from the web server. In this case, the following items relate to the verification method and are unrelated to the verification order.

③-1) The CertificateVerify message is verified with the public key of X.509 certificate of the web server included in the x509Certificate message.

③-2) It is verified whether the web server X. 509 certificate was issued by a trustworthy certificate authority.

③-3) It is confirmed whether the URL specified in the web server X. 509 certificate matches the URL that browser accesses.

Hereinafter, the TLS-based authentication method without intervention of a certificate authority according to an embodiment of the present invention will be described in detail with reference to FIGS. 6 to 8.

Figure 6:
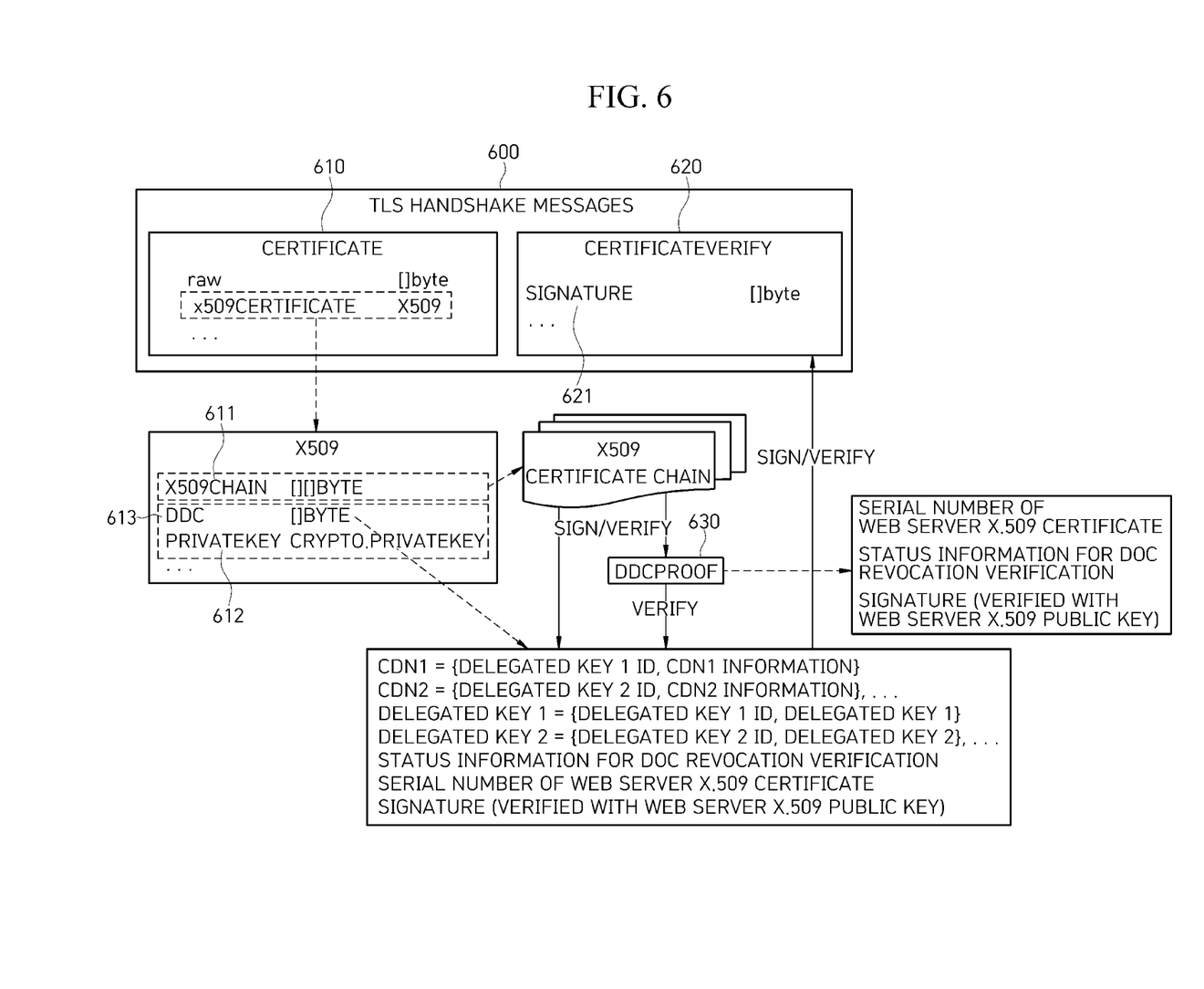
FIG. 6 is a diagram illustrating the TLS data model proposed in an embodiment of the present invention.

FIG. 6 is a diagram illustrating the TLS data model proposed in an embodiment of the present invention.

Referring to FIG. 6, unlike the existing data model, the present invention configures a TLS data model 600 by adding delegated data (DDC, 613) and delegated proof data (DDCProof, 630). The existing X509 structure included the certificate authority, the X.509 certificate of the web server, and the private key paired with the public key of the X. 509 certificate of the web server. Accordingly, the public key and private key of the X.509 certificate of the web server were used during the TLS handshake process and data signature.

However, the improved TLS data model 600 according to an embodiment of the present invention includes data (delegated data, DDC, 613) including information on the delegated entity, a set of public keys used by the delegated entity, etc., and private key 612 paired with one of the public keys included in the delegated data. That is, an embodiment of the present invention does not use the public key and private key of the X. 509 certificate when verifying or signing the TLS handshake message 600, but uses the public key specified in the delegated data 613 and the private key paired with the corresponding public key. Additionally, in the TLS authentication process, the private key of the X. 509 certificate of the web server is not used at all, and is used only when generating or updating the delegated data 613 and the delegated proof data 630.

The following Tables 1 and 2 show the delegated data and the delegated proof data according to an embodiment of the present invention.

TABLE 1

DDC data structure

| | | |
|---|---|---|
| Serial | Serial number of X.509 certificate that delegates authentication authority | |
| Version | Number increasing by 1 each time DDC changes from an initial value. | |
| Expiration date | Expiration date of DDC | |
| CDNs | Entity ID | ID for identifying a specific CDN among multiple CDNS delegated through DDC. Use a unique value within DDC. |
| | delegated key ID | ID for identifying a specific TLS authentication key among multiple TLS authentication keys existing within delegated keys of DDC. Use unique value within DDC. |

TABLE 1-continued

DDC data structure

| | | |
|---|---|---|
| | Description | Description that provides information about corresponding object |
| X.509 subject | Entity ID | Since CDNs are an array with entity ID, delegated key ID, and description data set, authentication key can be delegated to multiple CDNs through items of the CDNs. When performing TLS authentication through DDC, web service operators may also specify the authentication key they will use, like CDNs. Use a unique value within DDC. |
| | delegated key ID | |
| | Description | |
| delegated keys | delegated key ID | Items of delegated keys include a public key used for multiple TLS authentication. ID for identifying a specific public key. Use a unique value within DDC. |
| | delegated key | Public key used for TLS authentication |
| | Metadata | Public key and authentication metadata used for TLS authentication (algorithm, cipher suites used for TLS, etc.) |
| | | Since delegated keys are an array having delegated key ID and delegated key metadata data set, multiple public keys used for TLS authentication may be specified through the items of the delegated keys. |
| Signature | | DDC data signed with a private key of the web server X.509 certificate |

TABLE 2

DDCProof data structure

| | |
|---|---|
| Serial | Serial number of X.509 certificate that delegates authentication authority |
| Version | Number synchronized with version of DDC. |
| Expiration date | Expiration date of DDCProof |
| Signature | DDCProof data signed with a private key of the web server X.509 certificate |

Figure 7:
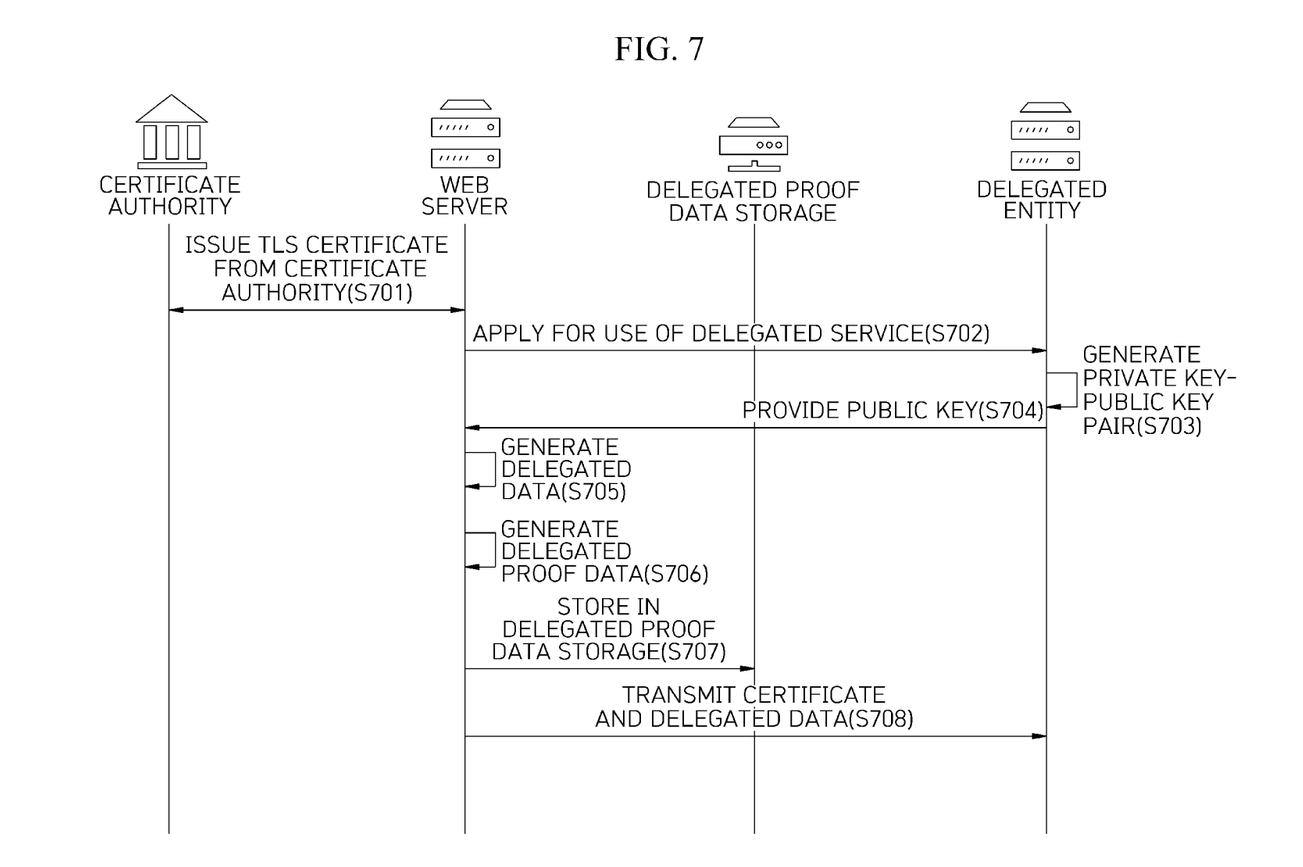
FIG. 7 is a flowchart for describing an authentication delegation method among TLS-based authentication methods according to an embodiment of the present invention.

FIG. 7 is a flowchart for describing an authentication delegation method among the TLS-based authentication methods according to an embodiment of the present invention.

First, the web server receives a certificate for TLS authentication from the certificate authority (S701) and then transmits a CDN service use application for using use a service (CDN service) provided by a delegated entity to the delegated entity. In this case, a delegated request is also transmitted (S702).

Next, the delegated entity stably generates a private key-public key pair, to which an X.509 authentication authority of a web server is delegated, in a delegated entity local system (S703) and transmits the generated private key-public key pair to the web server (S704).

Next, the web server generates the delegated data based on the public key (S705).

In an embodiment, the web server assigns a delegated key ID for identification of a public key (delegated key) to an item of a delegated key constituting the delegated data. The public key of the delegated entity is added to the assigned item of the delegated key. The delegated data may be generated by adding the public key and authentication-related metadata to the item of the delegated key.

In an embodiment, the web server may assign the delegated entity ID to identify the delegated entity to the delegated entity item constituting the delegated data, and add the public key ID (delegated key ID) of the delegated entity to the delegated entity item to generate the delegated data. In addition, the delegated entity information may be specified in a description item if necessary.

In an embodiment, when the public key is added while the delegated data has already been generated, the web server may increase the counting of the version item of the delegated data. When the delegated data is initially generated, an initial value may be assigned to the version item of the delegated data. In other words, when the public key is added to the delegated data (DDC) that has already been generated, 1 may be added to the existing version value, and when the public key is added by newly generating the delegated data, the initial value of the version may be input.

In addition, in an embodiment, the value of signing the delegated data generated with the private key of the X.509 certificate of the web server may be configured as a signature item.

Next, the web server generates the delegated proof data having the same version value as the delegated data (S706).

Next, the web server stores the delegated proof data in the delegated proof data storage (S707). In this case, the delegated proof data storage should be accessed by the browser and bring the delegated proof data during the later TLS authentication process. The delegated proof data storage may be storage that safely stores delegated proof data, such as Authoritative DNS, decentralized storage, and a centralized server, and that allows the browser to freely access later to obtain the delegated proof data.

Next, the web server delivers the X.509 certificate of the web server and the delegated data to the delegated entity (S708).

Figure 8:
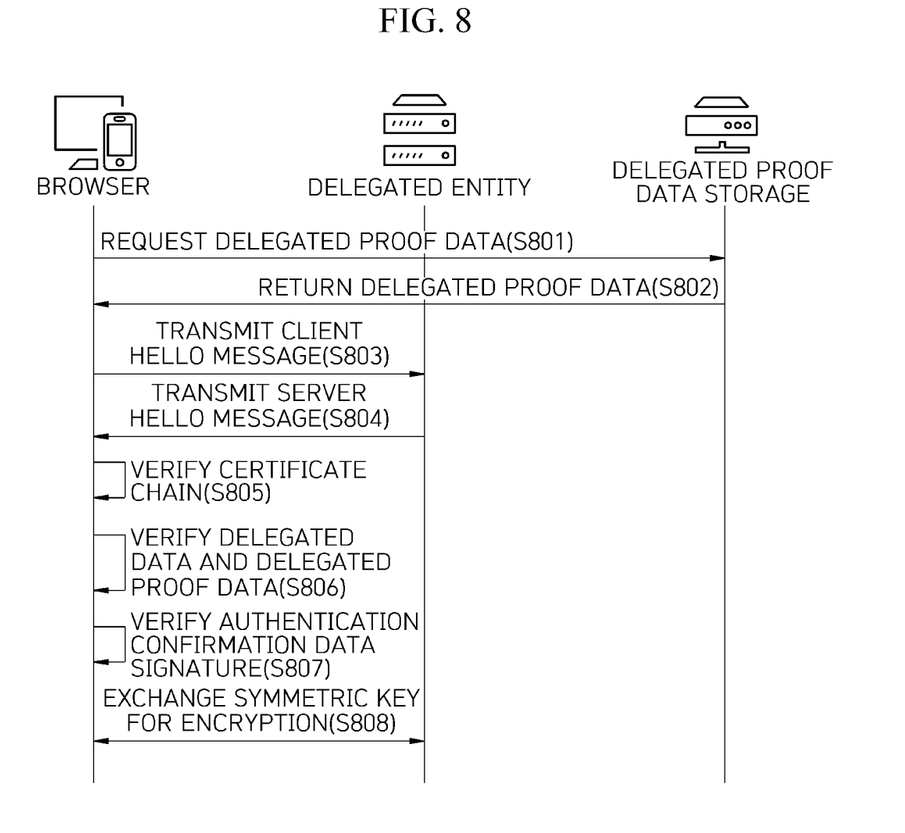
FIG. 8 is a flowchart for describing a TLS authentication scenario among the TLS-based authentication methods according to an embodiment of the present invention.

FIG. 8 is a flowchart for describing a TLS authentication scenario among the TLS-based authentication method according to an embodiment of the present invention.

First, the browser requests the delegated proof data from the web server (S801). That is, the browser requests the delegated proof data stored in the delegated proof data storage of the web server, and thus, receives the delegated proof data stored in the delegated proof data storage (S802).

In this case, the location of the delegated proof data storage can be confirmed in various ways. For example, when the delegated proof data is registered as a record in the DNS server used by the web server, the delegated proof data may be naturally obtained during the DNS query process. In addition, there may be a method in which the web server informs the browser of the location of the delegated proof data storage during the TLS handshake process.

Next, the browser transmits a client hello message to the delegated entity (S803). This client hello message includes information (DDCExtension) that the TLS authentication is possible through the delegated data and the delegated proof data in the browser.

Next, the delegated entity transmits a server hello message to the browser in response to the client hello message (S804). In this case, the server hello message may include not only the TLS handshake message including the web server certificate, but also the delegated entity ID for identifying the delegated entity through the delegated data and the delegated key ID indicating the location of the public key for verifying the TLS handshake message transmitted by the delegated entity. Meanwhile, the browser may sign the CertificateVerify included in the TLS handshake message using the private key paired with the public key indicated by the delegated key ID.

Next, the browser verifies whether the delegated entity has received the authentication authority from the web server based on the server hello message (S805).

In an embodiment, the browser may verify an X.509 certificate chain in the same way as before. In other words, it is possible to verify the CertificateVerify message with the X.509 certificate including the URL and public key of the web server, or confirm whether the URL specified in the X.509 certificate matches the URL that it accesses. Alternatively, it is possible to verify whether the certificate is issued by the trustworthy certificate authority based on the X.509 certificate including the identity information of the certificate authority that issues the certificate to the web server.

In an embodiment, the browser may verify the signatures of the delegated data and the delegated proof data based on the public key of the web server certificate included in the TLS handshake message.

In an embodiment, the browser compares the values of the version items of the delegated data and the delegated proof data. As a result of the comparison, when the two version values are the same, the delegated data may be determined to be valid.

In addition, as a result of comparison, when the value of the version item of delegated proof data is different from the value of the version item of the delegated data within the preset range, the browser may determine that the delegated data is valid. In other words, considering the case where the synchronization of the versions of the delegated data and the delegated proof data is delayed due to the network delay, etc., even if the version of the delegated data proof data is smaller than the version of the delegated data by a specific value set by the web server, the delegated data may be determined to be valid. In other cases, the delegated data is determined to be invalid.

In an embodiment, the browser may verify the signature of the CertificateVerify included in the TLS handshake message based on the public key of the delegated entity included in the delegated data. In this case, the public key that may verify the signature of CertificateVerify in the delegated data may search for the array element of the items of the delegated keys where the delegated key ID exists and verify the signature of the CertificateVerify through the public key present in the array element.

Next, as the verification is completed, the browser exchanges the symmetric key for encryption with the delegated entity (S806).

Meanwhile, in the above description, operations S701 to S806 may be further divided into additional operations or combined into fewer operations according to an embodiment of the present invention. Also, some steps may be omitted if necessary, and an order between the steps may be changed.

Meanwhile, in an embodiment of the present invention, the terminal on which the web server or browser operates may be configured to include a communication module, a memory, and a processor.

The communication module may include both a wired communication module and a wireless communication module. The wired communication module may be implemented as a power line communication device, a telephone line communication device, cable home (MoCA), Ethernet, IEEE1294, an integrated wired home network, and an RS-485 control device. In addition, the wireless communication module may be configured in a module for implementing functions such as wireless LAN (WLAN), Bluetooth, HDR WPAN, UWB, ZigBee, Impulse Radio, 60 GHZ WPAN, Binary-CDMA, wireless USB technology and wireless HDMI technology, 5th (5G) generation communication, long term evolution-advanced (LTE-A), long term evolution (LTE), and wireless fidelity (Wi-Fi).

The memory stores programs run by the processor. Here, the memory collectively refers to a non-volatile storage device that continuously maintains stored information even when power is not supplied and a volatile storage device. For example, the memory may include NAND flash memories such as a compact flash (CF) card, a secure digital (SD) card, a memory stick, a solid-state drive (SSD), and a micro SD card, magnetic computer storage devices such as a hard disk drive (HDD), and optical disc drives such as CD-ROM and DVD-ROM, and the like.

The processor may execute software such as a program to control at least one other component (e.g., hardware or software component) related to the web server or browser, and may perform various data processing or calculations.

The above-described embodiment of the present invention may be embodied as a program (or application) and stored in a medium for execution in combination with a computer which is hardware.

In order for the computer to read the program and execute the methods implemented as the program, the program may include a code coded in a computer language such as C, C++, JAVA, Ruby, or machine language that the processor (CPU) of the computer may read through a device interface of the computer. Such code may include functional code related to a function or such defining functions necessary for executing the methods and include an execution procedure related control code necessary for the processor of the computer to execute the functions according to a predetermined procedure. In addition, the code may further include a memory reference related code for which location (address street number) in an internal or external memory of the computer the additional information or media necessary for the processor of the computer to execute the functions is to be referenced at. In addition, when the processor of the computer needs to communicate with any other computers, servers, or the like located remotely in order to execute the above functions, the code may further include a communication-related code for how to communicate with any other computers, servers, or the like using the communication module of the computer, what information or media to transmit/receive during communication, and the like.

The storage medium is not a medium that stores images therein for a while, such as a register, a cache, a memory, or the like, but means a medium that semi-permanently stores the images therein and is readable by an apparatus. Specifically, examples of the storage medium include, but are not limited to, ROM, random-access memory (RAM), CD-ROM, a magnetic tape, a floppy disk, an optical image storage device, and the like. That is, the program may be stored in various recording media on various servers accessible by the computer or in various recording media on the computer of the user. In addition, media may be distributed in a computer system connected by a network, and a computer-readable code may be stored in a distributed manner.

According to an embodiment of the present invention described above, through the improved TLS protocol authentication data model for the authentication key management without intervention of the certificate authority and the data structure that can add/delegate/revoke the authentication keys, it is possible to allow a third party to safely add/delegate/remove the authentication keys with the X.509 certificate authority.

In addition, the X.509 authentication subject such as the web service operator can safely delegate the X.509 authentication key to the third party such as CDN, and safely revoke the delegated authentication key.

The effects of the present invention are not limited to the above-described effects, and other effects that are not mentioned may be obviously understood by those skilled in the art from the following description.

The above description of the present invention is for illustrative purposes, and those skilled in the art to which the present invention pertains will understand that it may be easily modified to other specific forms without changing the technical spirit or essential features of the present invention. Therefore, it should be understood that the above-mentioned embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-described description and all modifications and alternations derived from the claims and their equivalents are included in the scope of the present invention.

What is claimed is:

1. A transport layer security (TLS)-based authentication method, comprising:
   receiving, in a web server, a certificate for TLS authentication issued from a certificate authority;
   transmitting a delegated request from the web server to a delegated entity;
   receiving, in the web server, a public key among a public key-private key pair generated by the delegated entity in response to the delegated request;
   generating, in the web server, delegated data based on the public key;
   generating, in the web server, delegated proof data having a version number synchronized with a version number the delegated data;
   storing, in the web server, the delegated proof data in a delegated proof data storage; and
   transmitting the certificate and delegated data from the web server to the delegated entity.

2. The TLS-based authentication method of claim 1, wherein the generating, in the web server, the delegated data based on the public key includes;
   assigning a delegated key ID for identification of the public key to an item of the delegated key constituting the delegated data;
   adding the public key of the delegated entity to the item of the delegated key; and
   adding the public key and authentication-related metadata to the item of the delegated key.

3. The TLS-based authentication method of claim 2, wherein the generating, in the web server, the delegated data based on the public key includes:
   assigning a delegated entity ID for identifying the delegated entity to the delegated entity item constituting the delegated data; and
   adding a public key ID of the delegated entity to a delegated entity item.

4. The TLS-based authentication method of claim 1, wherein the generating, in the web server, the delegated data based on the public key includes incrementing the version number of the delegated data when the public key is added while the delegated data is already generated.

5. The TLS-based authentication method of claim 1, wherein the generating, in the web server, the delegated data based on the public key includes assigning an initial value to a version item of the delegated data when the delegated data is initially generated.

6. The TLS-based authentication method of claim 1, wherein the generating, in the web server, the delegated data based on the public key includes configuring a value of signing the delegated data with the private key as a signature item of the delegated data.

7. The TLS-based authentication method of claim 1, further comprising:
   requesting delegated proof data by the browser from the web server;
   receiving, in the browser, the requested delegated proof data from the delegated proof data storage of the web server;
   transmitting a client hello message from the browser to the delegated entity;
   receiving, in the browser, a server hello message from the delegated entity in response to the client hello message;
   verifying, in the browser, whether the delegated entity has received an authentication authority based on the server hello message; and
   exchanging a symmetric key for encryption with the delegated entity as the verification is completed in the browser.

8. The TLS-based authentication method of claim 7, wherein the transmitting of the client hello message from the browser to the delegated entity includes transmitting the client hello message notifying that the TLS authentication based on the delegated data and delegated proof data is possible from the browser to the delegated entity.

9. The TLS-based authentication method of claim 7, wherein the receiving, in the browser, the server hello message from the delegated entity in response to the client hello message includes receiving the server hello message that includes a TLS handshake message including the certificate, a delegated entity ID for identifying the delegated entity, and a delegated key ID indicating a location of the public key for verifying the TLS handshake message.

10. The TLS-based authentication method of claim 9, wherein Certificate Verify included in the TLS handshake message is signed through the private key paired with the public key indicated by the delegated key ID.

11. The TLS-based authentication method of claim 9, wherein the receiving, in the browser, the server hello message from the delegated entity in response to the client hello message includes receiving the server hello message further including location information of the delegated proof data storage.

12. The TLS-based authentication method of claim 9, wherein the verifying, in the browser, whether the delegated entity has received the authentication authority based on the server hello message includes verifying a signature of the delegated data and the delegated proof data based on the public key of the certificate included in the TLS handshake message.

13. The TLS-based authentication method of claim 9, wherein the verifying, in the browser, whether the delegated entity has received the authentication authority based on the server hello message includes:
   comparing a values of a version items of the delegated data and a value of a version item of the delegated proof data; and
   determining that the delegated data is valid in response to the comparing determining that the value of the version item of the delegated data and the value of the version item of the delegated proof data are the same.

14. The TLS-based authentication method of claim 13, wherein the determining that the delegated data is valid includes determining that the delegated data is valid when the value of the version item of the delegated proof data is different from the value of the version item of the delegated data within a preset range.

15. The TLS-based authentication method of claim 9, wherein the verifying, in the browser, whether the delegated entity has received the authentication authority based on the server hello message includes verifying a signature of Certificate Verify included in the TLS handshake message based on the public key of the delegated entity included in the delegated data.

16. A TLS-based authentication method, comprising:
   requesting delegated proof data by a browser from a web server, the delegated proof data including information for verifying delegated data;
   receiving, in the browser, the requested delegated proof data from a delegated proof data storage of the web server;
   transmitting a client hello message from the browser to a delegated entity;
   receiving, in the browser, a server hello message from the delegated entity in response to the client hello message;
   verifying, in the browser, the delegated data using the delegated proof data, the verifying including determining whether the delegated entity has received an authentication authority based on the server hello message; and
   exchanging a symmetric key for encryption with the delegated entity in response to the verifying being completed in the browser.

* * * * *